(12) United States Patent
Örtegren et al.

(10) Patent No.: US 6,634,468 B2
(45) Date of Patent: Oct. 21, 2003

(54) METHOD FOR ASSEMBLY OF A BRAKE MECHANISM IN SAID CALIPER

(75) Inventors: Anders Örtegren, Landskrona (SE); Stefan Sandberg, Lomma (SE)

(73) Assignee: Haldex Brake Products AB (SE)

( * ) Notice: Subject to any disclaimer, the term of this patent is extended or adjusted under 35 U.S.C. 154(b) by 0 days.

(21) Appl. No.: 09/865,259

(22) Filed: May 25, 2001

(65) Prior Publication Data

US 2002/0014376 A1 Feb. 7, 2002

(30) Foreign Application Priority Data

May 31, 2000 (SE) .............................. 0002058
Aug. 18, 2000 (SE) .............................. 0002943

(51) Int. Cl.[7] ...................... F16D 55/00; F16D 65/14; F16D 55/226; F16D 55/224
(52) U.S. Cl. ..................... 188/71.1; 29/428; 188/73.31; 82/1.2
(58) Field of Search ................ 188/73.31, 73.39, 188/73.45, 73.44, 71.1, 73.47, 370, 72.4, 72.5, 72.7, 72.9; 29/700, 428; 408/31; 82/1.2

(56) References Cited

U.S. PATENT DOCUMENTS

| 3,517,777 | A | 6/1970 | Beller ...................... 188/73.1 |
| 3,724,616 | A | 4/1973 | Burnett ...................... 188/345 |

(List continued on next page.)

FOREIGN PATENT DOCUMENTS

| DE | 1 189 333 | 3/1965 |
| DE | 26 03 109 | 1/1976 |
| DE | 26 14321 C2 | 4/1976 |
| DE | 261 4321 | 10/1976 |
| DE | 76 09298 | 10/1976 |
| DE | 25 27 302 | 6/1977 |
| DE | 26 49 666 | 10/1978 |
| DE | 32 13 356 A1 | 4/1982 |
| DE | 33 48 359 C2 | 10/1983 |
| DE | 34 23 875 A1 | 6/1984 |

(List continued on next page.)

OTHER PUBLICATIONS

A Comparative Overview of Air Disc Brake Designs.
Mechanische Gleitsattelbremsen.
Scheibenbremse D2 Lucas P102 Aug. 1992 6 pages
Scheibenbremse 1000 V–GP103 Feb. 1994 3 pages.
Proceedings of the Institute of Mechanical Engineers International Conference for Commercial Vehicles Design and Development of Disc Brakes.
Bendix Heavy Vehicle Systems Group brochure listing features of the Bendix Air Disc Brake.
Die Knorr–Scheibenbremse–Feststellbremse.
Colette Bremsenbauarter.
Engineering drawing of an Allied Signal/Bendix Espana Air Disc Brake.
Engineering drawing of an Bendix Air Disc Brake Type 3700.
Engineering drawing of an Bendix Air Disc Brake Type 4300.

*Primary Examiner*—Douglas C. Butler
(74) *Attorney, Agent, or Firm*—St. Onge Steward Johnston & Reens LLC

(57) ABSTRACT

The present invention concerns a brake caliper and a method for assembly of a brake mechanism for a disc brake in said caliper. The caliper surrounds the brake disc on both sides and has a cavity for receiving the brake mechanism. The caliper is of an open design having an opening in the wall furthest from the brake disc. The inside of the caliper may be machined through the opening, before the brake mechanism is assembled in the caliper.

6 Claims, 5 Drawing Sheets

U.S. PATENT DOCUMENTS

| | | | | |
|---|---|---|---|---|
| 3,734,243 A | | 5/1973 | Girauldon | 188/72.4 |
| 3,741,350 A | | 6/1973 | Knapp | 188/72.6 |
| 3,800,923 A | * | 4/1974 | Rike | |
| 3,830,343 A | | 8/1974 | Gardner | 188/71.8 |
| 3,837,437 A | | 9/1974 | Martins | 188/71.8 |
| 3,937,304 A | | 2/1976 | Brix | 188/73.5 |
| 3,967,705 A | | 7/1976 | Johannesen | 188/71.9 |
| 4,018,310 A | | 4/1977 | Ritsema | 188/73.3 |
| 4,071,118 A | | 1/1978 | Johannesen | 188/71.9 |
| 4,109,765 A | | 8/1978 | Johannesen | 188/72.7 |
| 4,184,571 A | | 1/1980 | Karasudami | 188/72.7 |
| 4,222,310 A | | 9/1980 | Garrett | 92/128 |
| 4,378,863 A | | 4/1983 | Baum | 188/71.8 |
| 4,465,164 A | | 8/1984 | Anderson | 188/73.44 |
| 4,494,630 A | * | 1/1985 | Stoka et al. | |
| 4,522,286 A | | 6/1985 | Villata | 188/72.7 |
| 4,681,194 A | | 7/1987 | Tsuruta | 188/71.9 |
| 4,693,341 A | | 9/1987 | Drott | 188/72.7 |
| 4,705,147 A | | 11/1987 | Pressaco | 188/196 |
| 4,809,822 A | | 3/1989 | Margetts | 188/72.7 |
| 5,433,298 A | | 7/1995 | Antony | 188/72.7 |
| 5,540,311 A | * | 7/1996 | Kobayashi et al. | |
| 5,547,048 A | | 8/1996 | Antony | 188/72.9 |
| 5,590,742 A | | 1/1997 | Gutelius | 188/70 R |
| 5,833,035 A | | 11/1998 | Severinsson | 188/72.7 |
| 5,927,445 A | | 7/1999 | Bieker | 188/72.9 |
| 5,957,245 A | * | 9/1999 | Anger et al. | 188/71.1 |
| 5,960,914 A | | 10/1999 | Isai | 188/72.8 |
| 6,000,506 A | * | 12/1999 | Warwick | 188/73.31 |
| 2002/0043435 A1 | * | 4/2002 | Reeves | 188/73.31 |

FOREIGN PATENT DOCUMENTS

| | | |
|---|---|---|
| DE | 33 48 369 C2 | 3/1986 |
| DE | 33 48 369 A1 | 3/1986 |
| DE | 37 16 202 C2 | 5/1987 |
| DE | 37 16 202 A1 | 5/1987 |
| DE | 40 32 885 A1 | 10/1990 |
| DE | 40 32 886 A1 | 10/1990 |
| DE | 41 31 631 A1 | 9/1991 |
| DE | 43 07 019 A1 | 3/1993 |
| DE | 36 10 569 C2 | 2/1994 |
| DE | 195 15 063 | 4/1995 |
| EP | 0 145 535 | 10/1984 |
| EP | 0 182 336 B1 | 11/1985 |
| EP | 0 271 864 A3 | 12/1987 |
| EP | 0 271 864 A2 | 12/1987 |
| EP | 0 436 906 B1 | 12/1990 |
| EP | 0 478 917 A1 | 7/1991 |
| EP | 0 495 311 A1 | 12/1991 |
| EP | 1160480 * | 12/2001 |
| GB | 2 090 355 | 12/1981 |
| GB | 2 102 088 | 10/1984 |
| JP | 64-6423 | 1/1989 |
| JP | 4-14670 | 1/1992 |
| JP | 4-29141 | 2/1992 |
| JP | 3-2022 | 10/2000 |
| SU | 165 7070 A3 | 5/1985 |
| WO | WO96/12900 | 5/1996 |

* cited by examiner

METHOD FOR ASSEMBLY OF A BRAKE MECHANISM IN SAID CALIPER

CROSS REFERENCE OF PENDING APPLICATIONS

This application claims priority from pending Swedish Patent Application Numbers 0002058-6 filed on May 31, 2000 and 0002943-9 filed on Aug. 18, 2000.

TECHNICAL FIELD

The present invention concerns a caliper for a disc brake and a method for assembly of a brake mechanism in said caliper.

The caliper and brake mechanism according to the present invention is primarily intended for a heavy road vehicle but may quite as well be used for a lighter road vehicle or a rail vehicle.

PRIOR ART

It is previously known to furnish a brake caliper having a cover attached from the outside. See e.g. WO 96/12 900. The brake mechanism is held together as a unit during assembly. In this type of caliper there were problems concerning the sealing of the cover etc.

To improve the above concept a closed caliper was developed in which the brake unit is mounted from the other side as compared to the above caliper having a cover. See e.g. DE,C,195 15 063. This solution may give difficulties concerning strength of the bearing cages, assembly of the brake mechanism and machining of the caliper.

In the above and similar calipers the machining is made from the side closest to the brake disc, normally referred to as the front side. This is often cumbersome and time consuming and thus rather expensive, as there is a rather long distance for the tool. It is also previously known to machine support surfaces for the lever of the brake mechanism, through holes in the flanks of the caliper. Thus, there is a need for a method of machining the inside of the caliper, which is less time consuming and less expensive.

The assembly of the brake mechanism in the caliper is often cumbersome due to a tight tolerance between the size of the brake mechanism and the caliper. Due to the tight tolerance the time for assembly is rather long. Thus, there is a need for a method of assembly, which will reduce the difficulties and the time it takes to assemble the brake mechanism inside the caliper.

The side of the caliper facing the brake disc is normally referred to as the front side. The opposite side of the caliper is referred to as the rear side. When these and similar expressions are used in this description in connection with the caliper they refer to the said respective sides.

SUMMARY OF THE INVENTION

One object of the present invention is to facilitate machining of the inside of the caliper.

In order to prepare the caliper for the assembly of the brake mechanism, the inside of the caliper is normally machined. According to the invention the machining is preferably made through an opening of the caliper. The opening is placed on the rear side of the caliper. Thus, the caliper will have an open design and is in this description often referred to as an open caliper. In order to give the bearing bracket of the brake mechanism correct and accurate position the caliper has to be machined from the rear. It is difficult and time consuming to machine the caliper from the inside as it will demand the use of an angular cutter and an extensive fixture which is not feasible in line production.

A further object of the present invention is to facilitate assembly of the brake mechanism inside the caliper.

The invention makes it possible to assemble the brake mechanism without the use of fastening means between the brake mechanism and the rear of the caliper. This is of advantage as the reaction forces on the fastening means will be considerable at a high braking torque. The brake mechanism is held in position by means of a spring urging the mechanism against the caliper.

Assembly is made considerably easier as it is possible to "operate" from two directions as the bearing bracket and the sealing together with the further modules of the mechanism are brought into the caliper. It is then also possible to keep the bearing bracket fixed from the outside until the other modules and the mechanism spring has been mounted. The bearing bracket may be made in any optional and suitable material.

The brake mechanism may be assembled as one unit in the caliper. However, due to the dimensions of the caliper and/or the brake mechanism it may be necessary to assemble the brake mechanism in two or more parts. It may not be physically possible to insert the brake mechanism as one unit.

Further objects and advantages of the invention will be obvious for a person skilled in the art from reading the description below.

The brake mechanism of the present invention is preferably pneumatically actuated, but it may also be hydraulically or electrically actuated.

BRIEF DESCRIPTION OF THE DRAWINGS

An embodiment of the invention will be more closely described below by way of an example and by reference to the enclosed Figs., in which.

DETAILED DESCRIPTION OF PREFERRED EMBODIMENTS

Figure 1:
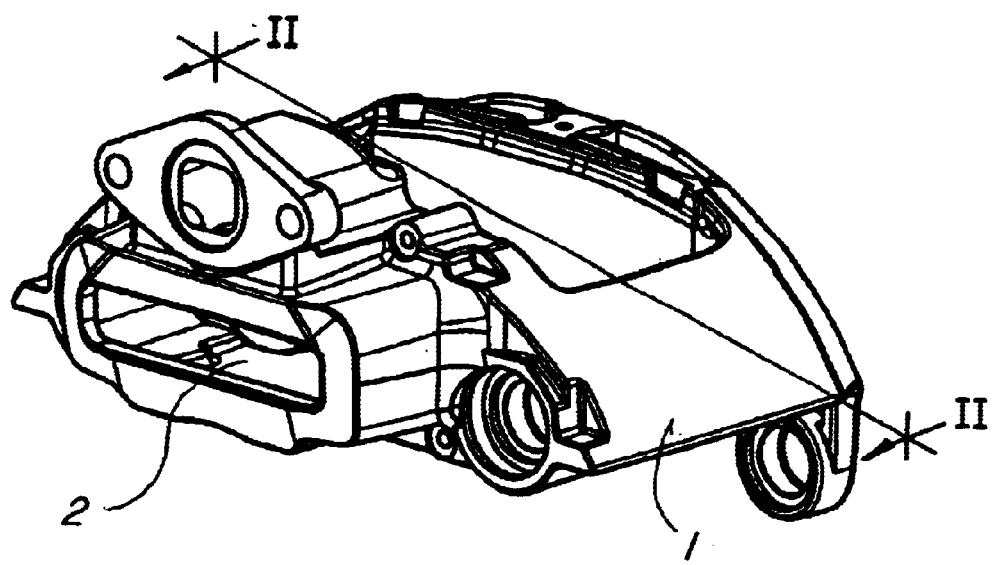
FIG. 1 is a perspective view of an open caliper according to the invention.
Figure 2:
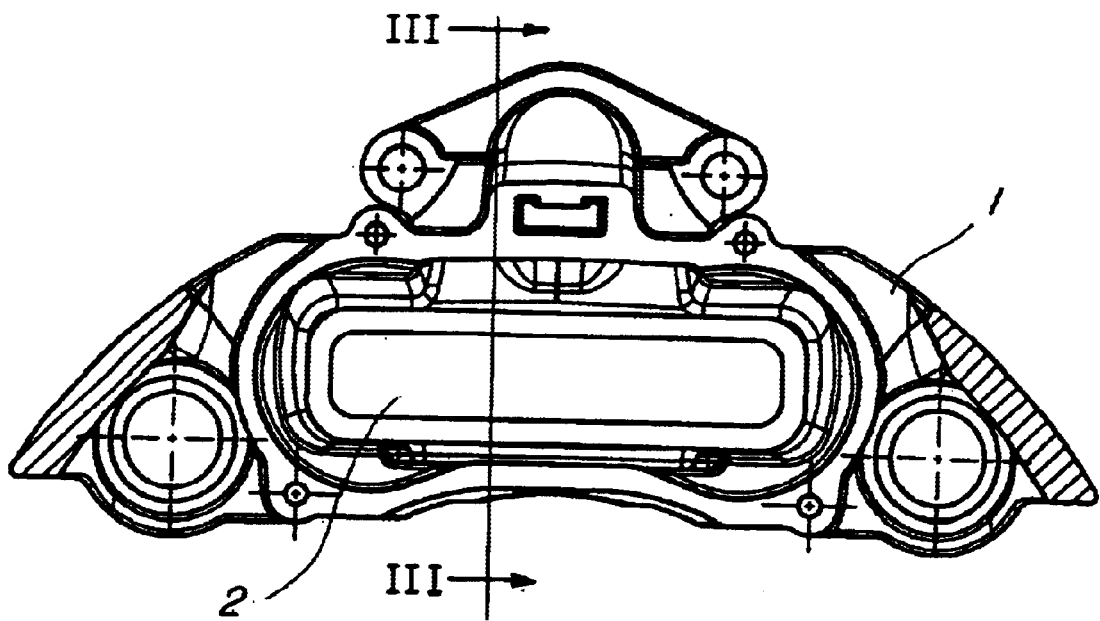
FIG. 2 is a cross section taken along the line II—II of FIG. 1.
Figure 3:
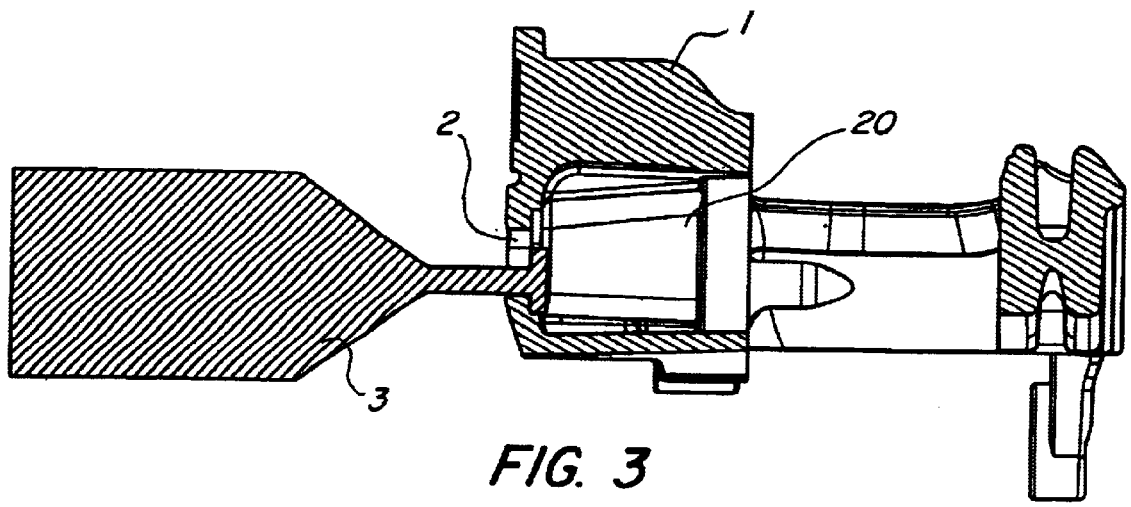
FIG. 3 is a cross section of the open caliper taken along the line III—III of FIG. 2 and also showing machining of the inside of the caliper.

Before assembly of the brake mechanism the caliper 1 has to be machined. The caliper 1 is furnished with an opening 2 on the rear side, i.e. in the wall furthest from the brake disc (not shown). Through said opening 2 a tool, e.g. in the form of a rotary milling tool 3, is inserted to machine the inside of the caliper 1 as shown in FIG. 3. The inside of the caliper 1 is machined to give a plane and smooth surface for the brake mechanism. Thus, the opening 2 of the caliper 1 facilitates the machining of the inside of the caliper 1.

After the machining of the inside of the caliper 1 the brake mechanism is assembled. The brake mechanism may be assembled as one unit, or in several steps as two or more units.

After assembly the open caliper 1 will surround the brake disc (not shown) on both sides, thus, reaching over the brake disc. Furthermore, the caliper 1 has a cavity 20 for receiving the brake mechanism.

Figure 4:
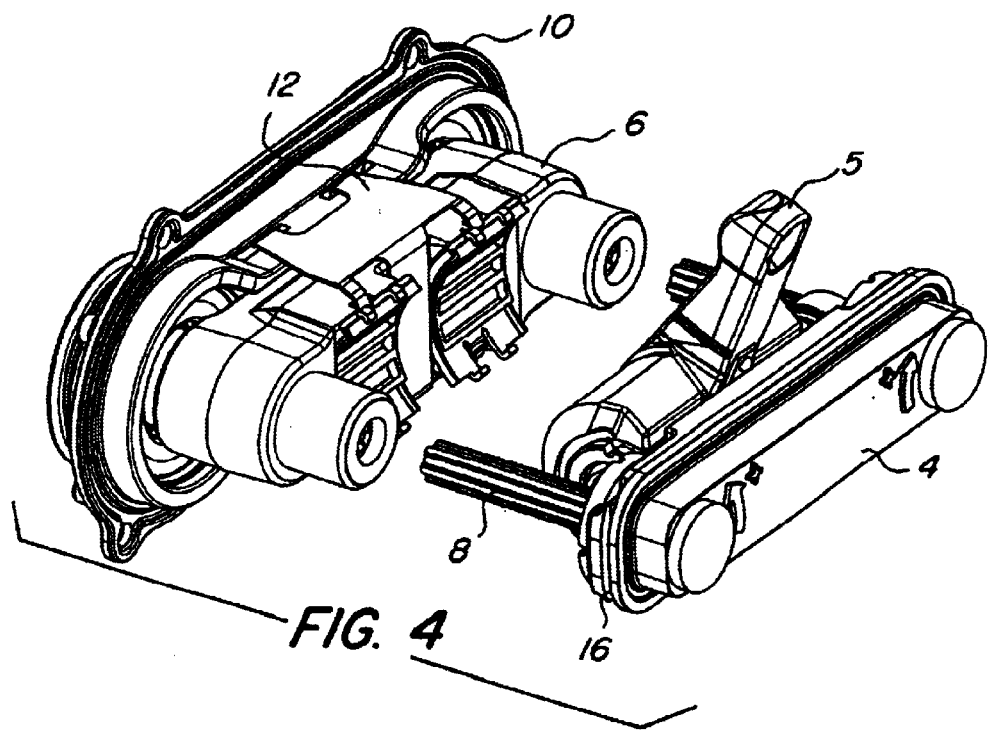
FIG. 4 is an example of a brake mechanism to be assembled in the caliper.

The brake mechanism comprises a bearing bracket 4, which is received in the opening 2 of the caliper 1. The bearing bracket 4 may be made of any optional material. The bearing bracket 4 is to withstand the actuating forces of the disc brake. In the embodiment of FIG. 4 a lever 5 and two reset and adjuster shafts 8 form one unit together with the bearing bracket 4. The lever 5 is held at the bearing bracket 4 by means of clips (cf. FIG. 5). In normal way the brake mechanism further comprises a cross bar 6, a closing plate 10, thrust plates, an adjuster mechanism and a synchronisation unit, etc. Some of these parts are not shown in FIG. 4. Said further parts form a second unit of the brake mechanism held together by a brace 12. Depending on the size of the caliper 1 in relation to the brake mechanism, the brake mechanism is assembled in the caliper 1 as one or more units.

The caliper 1 is machined from the rear side of the caliper 1 to guarantee a correct and accurate position for the bearing bracket 4. The machining is done in an area on the inside of the caliper 1 surrounding the opening 2.

Figure 5:
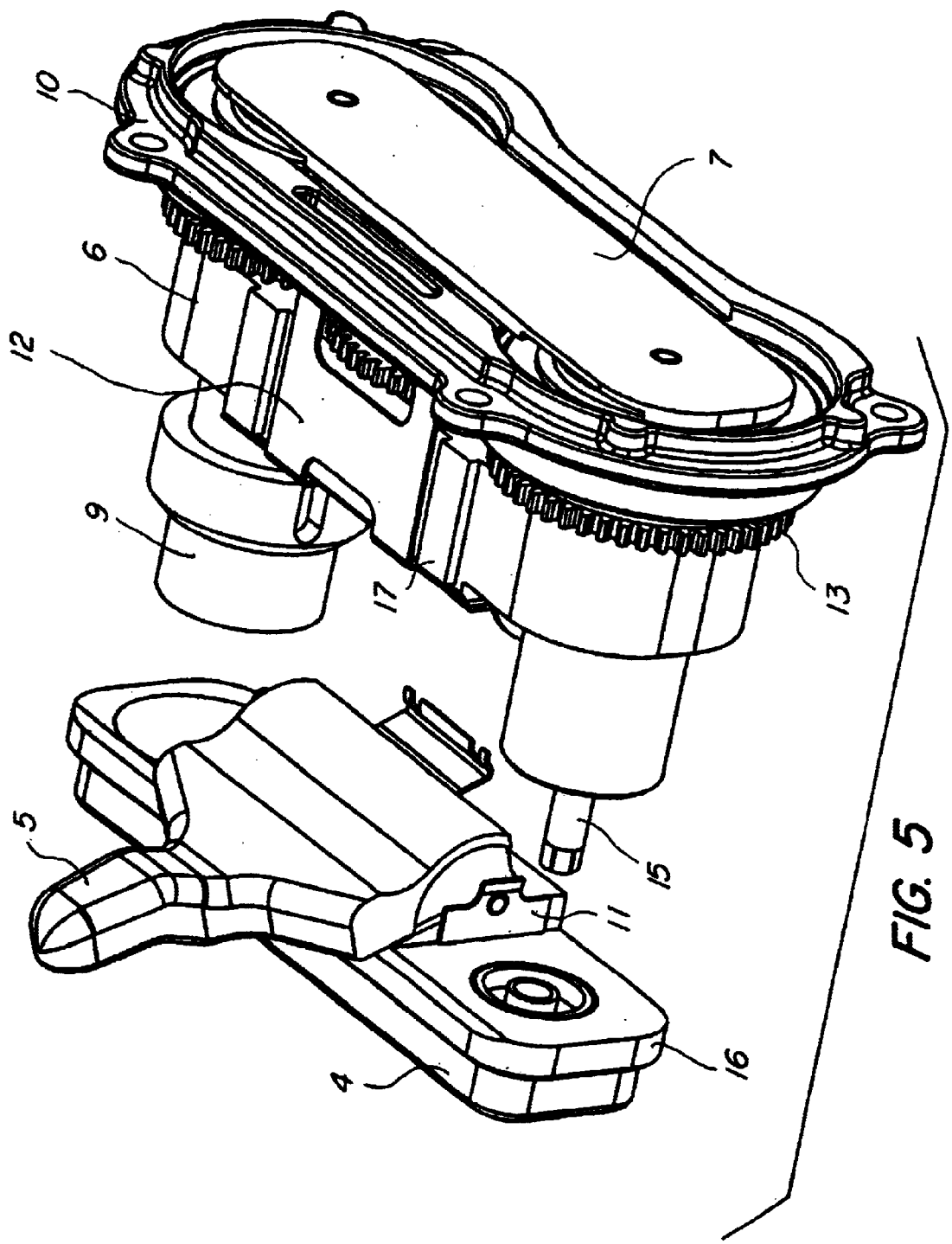
FIG. 5 is an example of an alternative embodiment of a brake mechanism.

In the embodiment of FIG. 5 the lever 5 and the bearing bracket 4 forms one unit. Corresponding parts are given the same reference signs in the embodiments of both FIGS. 4 and 5. The bearing bracket 4 holds the lever 5 by means of clips 11. The other part of the brake mechanism is held together by means of a brace 12. This second unit of the brake mechanism comprises e.g. thrust units 14, a reset shaft 15, an adjuster mechanism 9, synchronisation gears 13, a cross bar 6, a return spring 18, a closing plate 10 and a thrust plate 7. As for the embodiment of FIG. 4 the brake mechanism of FIG. 5 may be mounted in the brake caliper 1 as one or two units.

Figure 6:
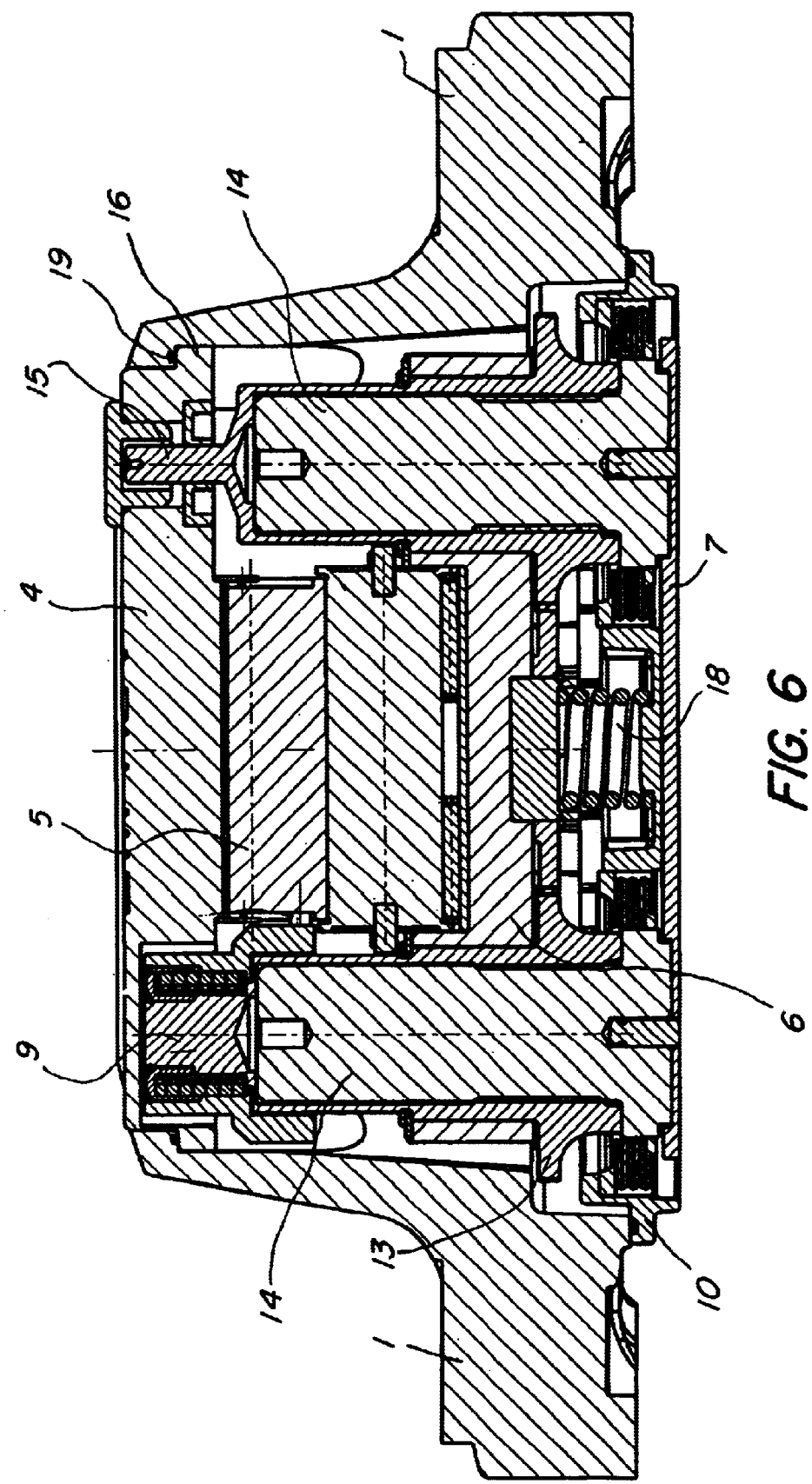
FIG. 6 is a cross section of the open caliper in which the brake mechanism of FIG. 5 is assembled.

In FIG. 6 the brake mechanism of FIG. 5 is shown in cross section mounted in the brake caliper 1.

A person skilled in the art realises that the method of assembly and the open caliper 1 may be used for many different types of brake mechanisms. Thus, the brake mechanisms indicated in FIGS. 4 to 6, are only two examples of the possible brake mechanisms.

A sealing 19 (indicated in FIGS. 6 and 7, respectively) is placed between the bearing bracket 4 and the open caliper 1. The sealing 19 between the bearing bracket 4 and the open caliper 1 is received in a groove of the bearing bracket 4 or the caliper 1. The groove and thus the sealing 19 may be placed in any position axially or radially in the bearing bracket 4 or caliper 1. If the sealing 19 is placed in a groove of the caliper 1, the sealing 19 is normally mounted by means of the opening 2 of the caliper 1 before assembly of the brake mechanism.

In the embodiment of FIG. 5 the cross bar 6 has four protruding parts 17. The protruding parts 17 of the cross bar 6 are to abut the inside of the caliper 1 allowing a slight movement between the cross bar 6 and the caliper 1. In this embodiment the brake mechanism is assembled without the use of fastening means between the brake mechanism and the rear of the caliper 1. The part of the caliper 1 in contact with the protruding parts 17 of the cross bar 6 is machined to give a smooth surface. This machining is also done via the opening 2 of the open caliper 1.

The bearing bracket 4 is received in the opening 2 of the caliper 1. The bearing bracket 4 has a shoulder 16 abutting the inside of the caliper 1 and thus, the bearing bracket 4 is placed in the opening 2 of the caliper 1 from the inside. The reaction of the clamp force of the brake is transmitted by means of the shoulder 16 of the bearing bracket 4 to the open caliper 1. Thus, the force is transmitted in an area surrounding the opening 2. As the bearing bracket 4 is a loaded part of the brake mechanism the bearing bracket and its shoulder 16 should have enough strength to transmit the force of reaction.

Figure 7:
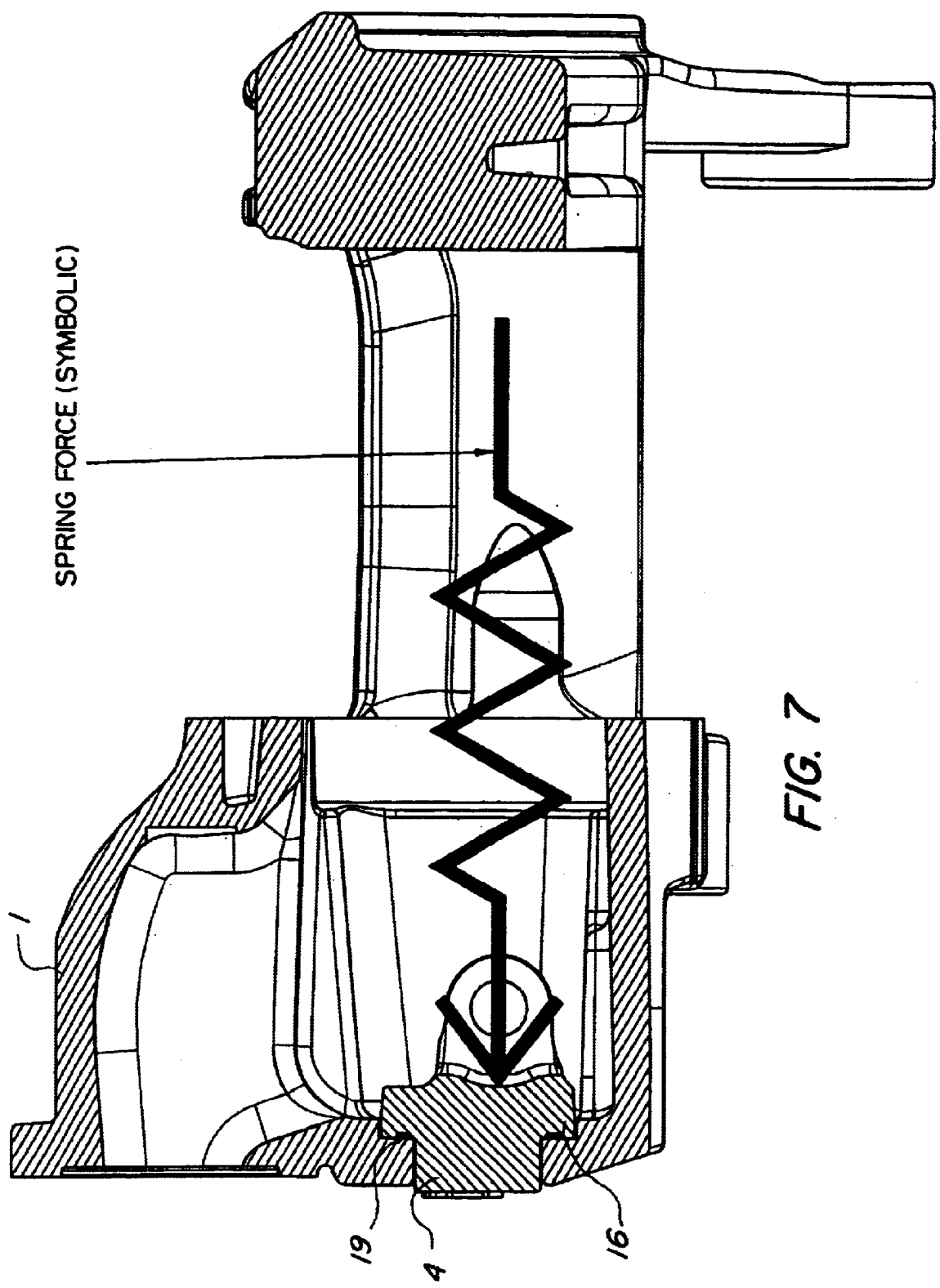
FIG. 7 shows the principal for how the bearing bracket is kept in position in the caliper.

During assembly of the brake mechanism the module consisting of the lever 5 and bearing bracket 4 is normally first brought into the open caliper 1, then the other module is brought in and the closing plate 10 is fixed to the caliper 1. The bearing bracket 4 may be held from the outside while the rest of the brake mechanism is mounted. As stated above the brake mechanism may be inserted as one unit in the caliper. After assembly the brake mechanism will be held together within the brake caliper 1 by screws (not shown) fixing the closing plate 10 to the caliper 1. As indicated in FIG. 7 the bearing bracket 4 is held in position by means of a spring force executed by the return spring 18 (see FIG. 6). The return spring 18 acts between the closing plate 10 and the brake mechanism. The closing plate 10 is fixed to the caliper 1.

The assembly is facilitated by the possibility to operate from two directions. Thus, it is possible to keep the bearing bracket 4 fixed from the outside until the rest of the mechanism including the return spring 18 has been mounted.

What is claimed is:

1. A method of assembly of a brake mechanism for a disc brake in a caliper, which caliper is to surround a brake disc on both sides and has a cavity for receiving the brake mechanism and an opening in a rear side wall, furthest from the brake disc, said rear side wall having an inside surface, said method comprising the steps of:

introducing through the opening in the rear side wall of the caliper, furthest from the brake disc, a tool; and machining the inside surface of the caliper surrounding the opening in the rear side wall with the too before assembly.

2. The method of claim 1, wherein said machining step comprises the step of machining the area surrounding the opening in the rear side wall of the caliper furthest from the brake disc on the inside surface to give an accurate bearing surface for a bearing bracket of the brake mechanism, and further comprises the step of bringing the bearing mechanism to abutment against the bearing by means of the bearing bracket closing the opening of the rear side wall of the caliper.

3. The method of claim 2, further comprising the step of receiving a seal in a groove of the bearing bracket.

4. The method of claim 2, further comprising the step of first mounting as one unit in the caliper, the bearing bracket including at least a lever.

5. The method of claim 4, further comprising the steps of:

mounting a one unit in the caliper the brake mechanism; and fixing the bearing bracket from outside of the caliper until the rest of the the mechanism has been mounted.

6. The method of claim 1, further comprising the step of placing a seal in a groove on the inside surface of the caliper by means of the opening before the brake mechanism is assembled.

* * * * *